United States Patent
Stoll et al.

(10) Patent No.: US 11,121,611 B2
(45) Date of Patent: Sep. 14, 2021

(54) METHOD FOR BALANCING ROTORS OF ELECTRICAL MACHINES

(71) Applicant: Dr. Ing. h.c. F. Porsche Aktiengesellschaft, Stuttgart (DE)

(72) Inventors: Johannes Stoll, Schorndorf (DE); Gregor Michna, Moensheim (DE); Peter Wurster, Kornwestheim (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 73 days.

(21) Appl. No.: 16/561,162

(22) Filed: Sep. 5, 2019

(65) Prior Publication Data

US 2020/0076284 A1     Mar. 5, 2020

(30) Foreign Application Priority Data

Sep. 5, 2018 (DE) .................... 10 2018 121 645.9

(51) Int. Cl.
*H02K 15/16*     (2006.01)
*H02K 7/04*     (2006.01)

(52) U.S. Cl.
CPC ............. *H02K 15/165* (2013.01); *H02K 7/04* (2013.01)

(58) Field of Classification Search
CPC ................................ H02K 15/165; H02K 7/04
See application file for complete search history.

(56) References Cited

U.S. PATENT DOCUMENTS

| 2010/0231064 A1 | 9/2010 | Leachman et al. |
| 2014/0375166 A1* | 12/2014 | Barton .................. H02K 1/22 310/216.116 |
| 2015/0288246 A1 | 10/2015 | Koo |
| 2016/0349137 A1 | 12/2016 | Guo et al. |

FOREIGN PATENT DOCUMENTS

| CN | 1925278 | 3/2007 |
| CN | 203554175 | 4/2014 |
| CN | 204131258 | 1/2015 |
| CN | 104753277 | 7/2015 |

(Continued)

OTHER PUBLICATIONS

German Search Report dated Jul. 16, 2019.
Chinese Search Report dated Apr. 21, 2021.

*Primary Examiner* — Peter Dungba Vo
*Assistant Examiner* — Jose K Abraham
(74) *Attorney, Agent, or Firm* — Gerald E. Hespos; Michael J. Porco; Matthew T. Hespos

(57) ABSTRACT

A method is provided for balancing rotors (10) of electrical machines. Each rotor (10) has a shaft (11) and at least one laminated core (12) is arranged on the shaft. The method includes providing blanks (13) with a length (l) that is smaller than an outside diameter (d) of the laminated core (12) of the rotor (10). A magnitude and orientation of an initial unbalance of the rotor (10) then is ascertained. A recess (15) then is made in each blank (13) spaced from the center of gravity by a distance depending on the magnitude of the ascertained initial unbalance. The blank (13) is mounted by fitting the recess (15) on the shaft (11) of the rotor (10) and mounting the processed blank (13) on the rotor (11) in an angular position that is dependent on the orientation of the ascertained initial unbalance.

10 Claims, 1 Drawing Sheet

(56) References Cited

FOREIGN PATENT DOCUMENTS

| | | |
|---|---|---|
| CN | 205017162 | 2/2016 |
| CN | 107546910 | 1/2018 |
| CN | 207321030 | 5/2018 |
| CN | 108494155 | 9/2018 |
| DE | 10 2010 009 317 | 11/2010 |
| JP | 60-70953 | 4/1985 |
| JP | 60-216750 | 10/1985 |
| JP | 2-26370 | 2/1990 |
| JP | 7-107713 | 4/1995 |
| JP | 2000-134882 | 5/2000 |
| JP | 2003-230260 | 8/2003 |
| JP | 2008-154309 | 7/2008 |
| JP | 2012-205402 | 10/2012 |
| JP | 2013-029464 | 2/2013 |
| KR | 10-2007-0113732 | 11/2007 |

\* cited by examiner

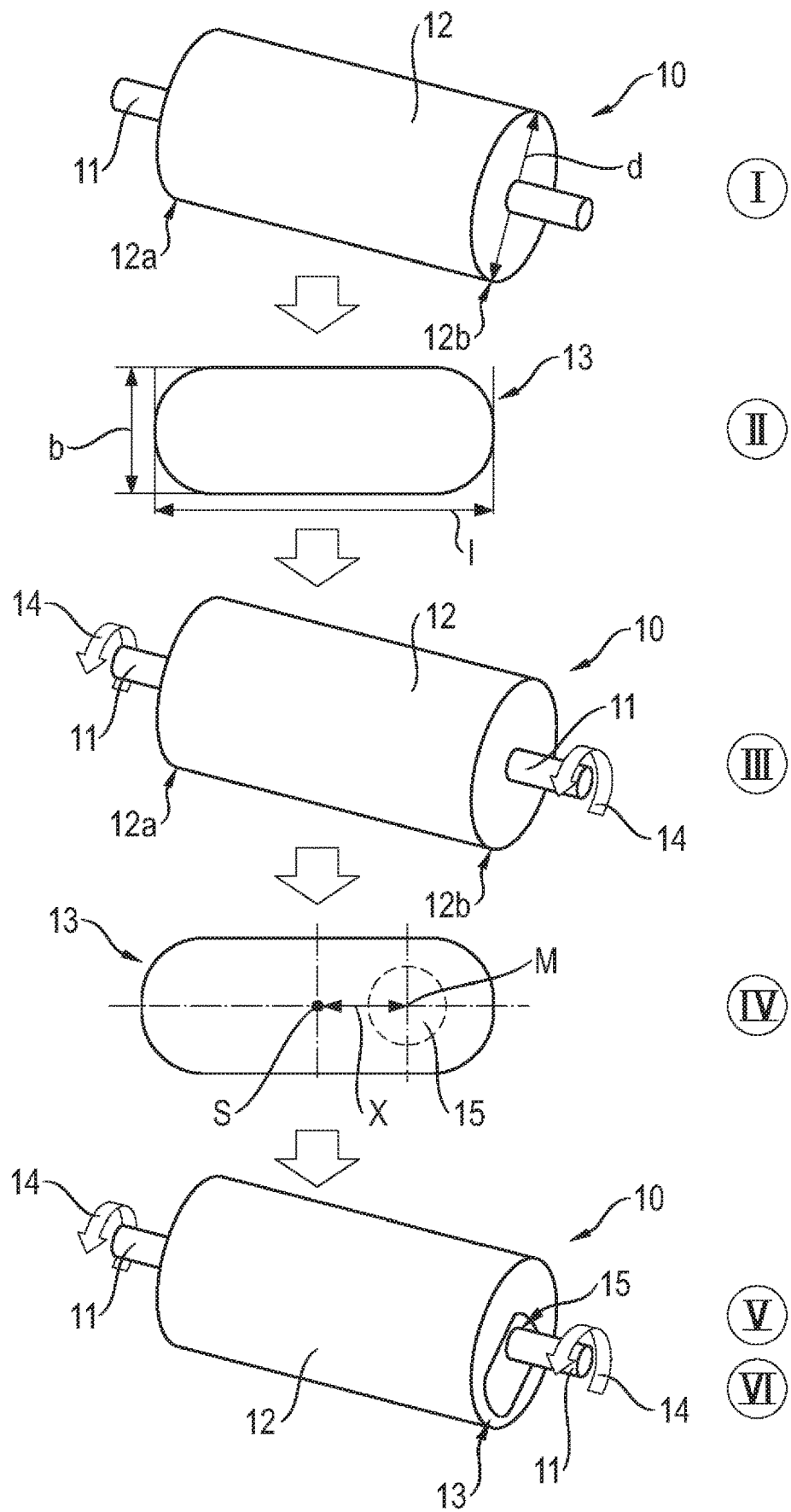

METHOD FOR BALANCING ROTORS OF ELECTRICAL MACHINES

CROSS REFERENCE TO RELATED APPLICATION

This application claims priority under 35 USC 119 to German Patent Appl. No. 10 2018 121 645.9 filed on Sep. 5, 2018, the entire disclosure of which is incorporated herein by reference.

BACKGROUND

Field of the Invention

The invention relates to a method for balancing rotors of electrical machines.

Related Art

A rotor of an electrical machine has a shaft and a laminated core is positioned on the shaft. Magnets are positioned in magnet pockets of the laminated core and form pole pairs. The laminated core of the rotor of an electrical machine can be designed as a segmented laminated core comprising laminated core segments that are positioned next to one another and/or one behind the other as seen in the axial direction of the shaft.

In spite of an often symmetrical design of the rotor, manufacturing deviations in the individual assemblies of the rotor lead to an unbalance. If the unbalance of the rotor exceeds a limit value, undesired vibrations, noises or premature breakdown occur during operation of the electrical machine.

A rotor of an electrical machine can be balanced to compensate for the unbalance of a rotor of an electrical machine. In this case, the unbalance is eliminated by mass compensation at the rotor.

The mass compensation during balancing can be carried out by removing mass by way of so-called negative balancing or by adding mass as so-called positive balancing.

Negative balancing is also referred to as subtractive balancing, and positive balancing is also referred to as additive balancing.

Negative balancing typically is used for balancing a rotor of an electrical machine. However, the damage to the rotor of an electrical machine during negative balancing cannot be tolerated for high-power machines.

Therefore, it is known for the electrical machine to have ready on the rotor, in addition to the abovementioned assemblies of the shaft, the laminated core and the magnet, a sacrificial mass from which mass can be removed for negative balancing. Sacrificial masses of this kind for negative balancing can be part of a balancing disk. However, balancing disks of this kind have the disadvantages that the axial structural length of the rotor is increased and the mass of the rotor is increased.

Positive balancing can be executed for balancing a rotor of an electrical machine to avoid the disadvantages of negative balancing. In the case of positive balancing, material is applied to points on the rotor of an electrical machine, specifically solely at those points of the rotor at which it is necessary for minimizing the unbalance. Rotors that are balanced by positive balancing are lighter than rotors that are balanced by negative balancing.

The methods known from the prior art for positive balancing are not suitable for rotors of electrical machines that are operated at a rotation speed of more than 15,000 rpm or even at a rotation speed of more than 17,000 rpm, specifically in respect of industrial manufacture of rotors of this kind within short cycle times.

There is therefore a need for a novel method for balancing rotors of electrical machines that is suitable for balancing high-speed electrical machines within short cycle times during manufacture.

The object of the invention is to provide a novel method for balancing rotors of electrical machines.

SUMMARY

The method according to the invention comprises at least the following steps:

The invention relates to a method that includes providing a rotor of an electrical machine where the rotor is to be balanced. The method continues by providing blanks with a length that is smaller than the outside diameter of the at least one laminated core of the rotor. The method then includes ascertaining a magnitude and an orientation of an initial unbalance of the rotor that is to be balanced. The method continues by processing the blanks by making a recess in the respective blank outside the center of gravity depending on the magnitude of the ascertained initial unbalance of the rotor that is to be balanced. The blank can be mounted by the recess on the shaft of the rotor that is to be balanced. A distance of a center point of the recess to be made in the respective blank from the center of gravity of the respective blank is ascertained or determined depending on the magnitude of the initial unbalance of the rotor, which is to be balanced, and the recess is made in the blank depending on said distance. The method proceeds by mounting the processed blanks on the rotor that is to be balanced in an angular position that is dependent on the orientation of the ascertained initial unbalance.

In the method according to the invention, an initial unbalance of a rotor that is to be balanced initially is ascertained. Blanks then are processed, specifically depending on the magnitude of the ascertained initial unbalance. The recess by means of which the respective blank can be mounted on the shaft of the rotor is made in the blanks depending on the magnitude of the ascertained initial unbalance. The blank that is processed in this way is mounted on the rotor in a defined angular position depending on the orientation of the ascertained initial unbalance. The method for balancing a rotor of an electrical machine is particularly suitable for high-speed electrical machines to balance the high-speed electrical machines in an effective and highly accurate manner within short cycle times.

A magnitude and an orientation of the initial unbalance of the rotor that is to be balanced are ascertained with respect to the two axial ends of the laminated core. A respective blank is processed individually depending on the respective magnitude of the initial unbalance and individually mounted depending on the orientation of the initial unbalance for each axial end. Therefore, the rotor of the electrical machine can be balanced in a particularly advantageous manner.

The blanks may be composed of a paramagnetic, metal material with a thickness of between 0.3 mm and 1.0 mm, and a length of the blanks of one embodiment is between 60% and 90% of the outside diameter of the at least one laminated core. Blanks of this kind are particularly advantageously suitable for balancing the rotor of the electrical machine using the method according to the invention.

Preferred developments of the invention can be found in the following description. Without being restricted hereto, exemplary embodiments of the invention will be explained in more detail with reference to the drawing.

BRIEF DESCRIPTION OF THE DRAWINGS

FIG. 1 is a diagram for illustrating the method for balancing rotors of electrical machines.

DETAILED DESCRIPTION

The invention relates to a method for balancing rotors of electrical machines, in particular rotors of electrical machines of the kind that rotate at rotation speeds of more than 15,000 rpm, in particular of more than 17,000 rpm, during operation. Electrical machines of this kind are electrical machines which are used as drive assemblies in high-power vehicles.

The method for balancing rotors of electrical machines is described below with reference to FIG. 1, wherein various steps of the method according to the invention are shown by I, II, III, IV, V and VI in FIG. 1.

In a first step I, a rotor 10, which is to be balanced, of an electrical machine is initially provided.

A rotor 10 of this kind that is to be balanced has a shaft 11 and also a laminated core 12 that is arranged on the shaft 11 (a plurality of, for example four to eight, laminated cores can typically be provided). The laminated core 12 has magnet pockets in which magnets are accommodated.

In a second step II, blanks 13 are provided, and a blank 13 of this kind is shown schematically in FIG. 1.

The blank 13 of one embodiment is manufactured from a paramagnetic and metal material, for example from paramagnetic steel. The blanks 13 have a length l that is smaller than an outside diameter d of the laminated core 12 of the rotor 10. A width b of the blanks 13 is smaller than the length l thereof. The length l of the blanks 13 is preferably between 60% and 90%, preferably between 60% and 80%, of the outside diameter d of the laminated core 12 of the rotor 10 which is to be balanced. A thickness of the blanks 13 is typically between 0.3 mm and 1.0 mm.

After providing the rotor 10 that is to be balanced, in the first step I and after providing the blanks 13 in the second step II, an initial unbalance of the rotor 10 that is to be balanced is determined in a third step III.

To ascertain the initial unbalance of the rotor 10 that is to be balanced, the rotor is driven in rotation on an unbalance test stand in accordance with the arrows 14. The magnitude and the orientation of the initial unbalance are ascertained here.

In this case, a magnitude and an orientation of the initial unbalance of the rotor 10 that is to be balanced are ascertained with respect to the two axial ends 12a, 12b of the laminated core 12.

Accordingly, the unbalance ascertaining operation produces four measurement values, specifically, for the axial end 12a of the laminated core 12, a first magnitude and a first orientation and, for the second end 12b of the laminated core 12, a second magnitude and a second orientation of the initial unbalance of the rotor 10 that is to be balanced.

In a subsequent fourth step IV of the method, the blanks 13 are processed depending on the magnitude of the respective ascertained initial unbalance.

The blanks 13 are processed by way of a recess 15 that is outside the center of gravity being made in the respective blank 13, in particular by punching. The respective blank 13 can be mounted on the shaft 11 of the rotor 10 that is to be balanced by means of this circular recess 15 that is outside the center of gravity.

The diameter of the recess 15 that is made in the blank 13 during the processing in step IV is matched to the diameter of the shaft 11 of the rotor 10 that is to be balanced in such a way that the respective blank 13 can be arranged on the shaft 11 of the rotor 10 that is to be balanced, with a defined clearance fit.

FIG. 1 shows, in step IV, the center of gravity S of the blank 13 and also a center point M of the recess 15 that is made in the blank 13, preferably by punching. In this case, the distance x between the center of gravity S and the center point M is dependent on the magnitude of the respective ascertained initial unbalance of the rotor 10 which is to be balanced. The greater the magnitude of the initial unbalance of the rotor 10 that is to be balanced, the greater said distance x.

The distance x between the center of gravity S and the center point M is determined depending on the magnitude of the respective initial unbalance and the recess 15 is made in the respective blank 13, preferably by punching, depending on the distance.

As already stated, there may be a different magnitude of the unbalance in the region of the two ends 12a, 12b of the laminated core 12 of the rotor 10 that is to be balanced, so that, for each end 12a, 12b, an individual recess 15 with an individual distance x of the center point M of the respective recess 15 from the center of gravity S of the respective blank 13 then is made in the blank 13 that is to be positioned at the respective end 12a, 12b.

Following the processing of the blanks 13 in step IV depending on the magnitude of the respective ascertained initial unbalance, in a fifth step V the processed blanks 13 are mounted on the rotor 10 in an angular position that is dependent on the orientation of the ascertained initial unbalance. Since not only the magnitude of the initial unbalance but rather also the orientation of the initial unbalance can be different at the two axial ends 12a, 12b, the respective blank 13 can be mounted in an individual angular position on the rotor 10 in the region of each axial end 12a, 12b.

The blanks 13 are mounted on the axial ends 12a, 12b of the laminated core 12 of the rotor 10 by fitting the blanks 13 onto the shaft 11 at the respective end of the rotor 10 by way of their respective recess 15 and then by connecting the blanks 13 to the laminated core 12 at the respective axial end 12a, 12b of said laminated core. The connection is made in a materially bonded and/or interlocking manner. Materially bonded connection can be made by adhesive bonding or welding or baking. Interlocking connection can be made by latching or clipping. The blank can consist of a sheet-metal cutting or can be designed as a forged part.

In a further step VI, the result of the balancing can be checked by a repeated balancing process analogously to step III, but with blanks 13 mounted.

Accordingly, it lies within the scope of the invention to balance a rotor 10 of an electrical machine by way of initially measuring the initial unbalance of the rotor 10 that is to be balanced to determine a magnitude and an orientation of the initial unbalance, specifically with respect to the axial ends 12a, 12b of the laminated core 12 of the rotor 10 in each case. Depending on the magnitude of the respective initial unbalance, blanks 13 are processed, specifically by way of a recess 15 that is outside the center of gravity being made in said blanks and by means of which the respective blank 13 is later threaded onto the shaft 11. The distance x of the center point M of the respective recess 15 from the center of gravity S of the respective blank 13 is dependent on the magnitude of the ascertained initial unbalance. A blank 13 that is processed individually in respect of the magnitude of the initial unbalance is mounted on each axial end 12a, 12b of the laminated core 12 of the rotor 10 that is to be balanced depending on the respective orientation of the initial unbalance in a defined angular position.

An adaptive procedure of this kind for balancing rotors of electrical machines is suitable for balancing rotors that rotate at a rotation speed of more than 15,000 rpm, in particular more than 17,000 rpm during operation, within short cycle times during industrial manufacture of said rotors.

The method of the invention is suitable for an extremely wide variety of rotors of electrical machines. It is only necessary to correspondingly adapt the shape or contour and/or the thickness of the respective blank 13 depending on the magnitude of the unbalance.

Provision may optionally be made for the blank 13 to be positioned in the region of that end which is at a distance from the recess 15 that is made in the blank 13, that is to say on the opposite side of the center of gravity S of the blank 13 to the recess 15, to keep ready an increased mass. This can be done, for example, by radial projections at the respective end of the blank 13.

Balancing disks can be dispensed with. Balanced rotors of electrical machines with a low weight and a low axial structural length can be provided.

What is claimed is:

1. A method for balancing a rotor of an electrical machine, the rotor having a shaft with a diameter and at least one laminated core arranged on the shaft, the laminated core having opposite first and second axial ends, the method comprising:
   providing a rotor of an electrical machine,
   providing blanks, each of the blanks having a length that is smaller than an outside diameter of the laminated core of the rotor,
   ascertaining a magnitude and an angular orientation of an initial unbalance at least at a first end of the core of the rotor that is to be balanced, thereby defining an angular position for mounting the blanks on the rotor,
   processing at least a first of the blanks by making a recess in the first blank outside the center of gravity of the first blank, the recess having a diameter matched to the diameter of the shaft and being disposed so that a center of the recess is spaced from the center of gravity of the first blank by a distance depending on the magnitude of the ascertained initial unbalance at the first end of the laminated core,
   mounting the first blank by means of the recess on the shaft at the first end of the laminated core of the rotor that is to be balanced, and
   fixing the processed first blank on the laminated core of the rotor in the angular position.

2. The method of claim 1, wherein
   a step of ascertaining the magnitude and the angular orientation of the initial unbalance of the rotor that is to be balanced is carried out with respect to the first and second axial ends of the laminated core, and the step of processing at least the first blank comprises processing the first blank and a second blank individually depending on the ascertained magnitudes of the initial unbalance at the first and second axial ends of the laminated core and individually mounting the first and second blanks respectively at the first and second ends of the laminated core and fixing the first and second blanks at angular positions depending on the angular orientation of the initial unbalance for each of the first and second axial ends.

3. The method of claim 2, wherein a distance of a center point of the recess to be made in each blank from the center of gravity of the respective blank depending on the magnitude of the initial unbalance of the rotor that is to be balanced.

4. The method of claim 1, wherein a length of the blank is between 60% and 90% of the outside diameter of the laminated core.

5. The method of claim 1, wherein a thickness of the blank is between 0.3 mm and 1.0 mm.

6. The method of claim 1, wherein the blanks are composed of a metal material.

7. The method of claim 1, wherein the blanks are composed of a paramagnetic metal material.

8. The method of claim 1, wherein the blanks are mounted on the rotor that is to be balanced by fitting the blanks onto the shaft by way of their recess and then connecting the blanks to the laminated core.

9. The method of claim 8, wherein the processed blanks are connected in a materially-bonded manner to the laminated core by adhesive bonding or welding or baking.

10. The method of claim 9, wherein the processed blanks are connected in an interlocking manner to the laminated core by latching or clipping.

* * * * *